United States Patent Office 3,391,154
Patented July 2, 1968

3,391,154
PROCESS FOR PRODUCING
5-METHYLISOXAZOLE
Charles William Den Hollander, Midland Park, N.J., assignor to Hoffmann-La Roche Inc., Nutley, N.J., a corporation of New Jersey
No Drawing. Filed Feb. 14, 1966, Ser. No. 527,069
4 Claims. (Cl. 260—307)

ABSTRACT OF THE DISCLOSURE

A process for preparing 5-methylisoxazole utilizing an alkali metal hydroxymethyleneacetone and hydroxylamine-N-sulfonic acid is described. 5-methylisoxazole is useful as an intermediate for $N^1$-(5-methyl-3-isoxazolyl) sulfanilamide, a known antibacterial agent.

This invention is concerned with an improved process for producing 5-methylisoxazole by the reaction of an alkali metal salt of hydroxymethyleneacetone with hydroxylamine.

5-methylisoxazole, a useful intermediate for the preparation of the sulfa compound $N^1$-(5-methyl-3-isoxazolyl) sulfanilamide, has been produced in the past by the reaction of an alkali metal salt of hydroxymethyleneacetone with a hydroxyamine acid salt in an acidic aqueous mixture, as is illustrated by the following equation for the reaction of sodium hydroxymethyleneacetone with hydroxylamine hydrochloride in concentrated hydrochloric acid:

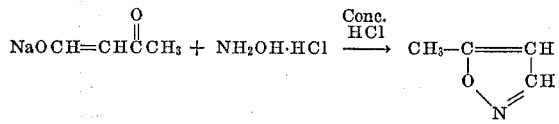

This method is not a particularly desirable route to 5-methylisoxazole, however, because the process also produces the 3-methylisoxazole isomer in fairly large amounts, often in a molar ratio with respect to the 5-isomer of about 1:2. In addition, this known process suffers from low yields of the combined isomers.

As an alternative, it has been proposed that the reaction be modified to produce first a "sesquioxime," followed by decomposition of the sesquioxime with acid, which is illustrated by the following two equations:

(a)
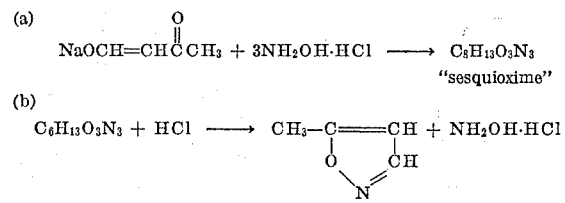

(b)

$C_6H_{13}O_3N_3 + HCl \longrightarrow CH_3-C{=\!=\!=}CH + NH_2OH \cdot HCl$

Although this process does improve the yield of 5-methylisoxazole, it still produces the 3-isomer in a ratio of about 1:7 of 3-isomer to 5-isomer. Furthermore, this process requires excess hydroxylamine for the production of the sesquioxime. This excess hydroxylamine, which is regenerated upon hydrolysis of the sesquioxime, must nevertheless be recovered and recycled to step (a) for an efficient process. Finally, this process requires that the sesquioxime be isolated before treatment with acid in step (b). As a result, this route is no more commercially attractive than the first-described process.

More recently, it has been discovered that when the reaction is conducted in the absence of added acid, i.e., in an aqueous rather than a concentrated hydrochloric acid medium, the formation of the 3-isomer is suppressed. Moreover, improved yields of methylisoxazole are obtained by minimizing the concentrations of alkali metal hydroxymethyleneacetone and 5-methylisoxazole in the reaction mixture, as by adding the alkali metal salt at a controlled rate and distilling off 5-methylisoxazole as it is formed. Despite these advantages, this process is not particularly desirable as a commercial method because of the necessity for close control.

It has been unexpectedly found by this invention that when hydroxylamine-N-sulfonic acid is substituted for the hydroxylamine acid salt of the prior art processes, the controlled addition of alkali metal hydroxymethyleneacetone is not required. Moreover, the amount of undesired 3-methylisoxazole can be reduced to less than 1 percent.

The reaction conditions are not critical, although it is generally preferred that the reaction be conducted in aqueous medium and in the absence of added acid to avoid formation of the 3-methylisoxazole. Neither the reaction temperature nor the method of addition of the reactants is narrowly critical. It is generally preferred, however, to conduct the reaction at temperatures of less than about 50° C. to avoid significant hydrolysis of the hydroxylamine-N-sulfonic acid to form hydroxylamine acid sulfate and sulfuric acid, which would promote the formation of the undesirable 3-isomer. Because the reaction is substantially instantaneous at room temperature, elevated temperatures are unnecessary.

The 5-methylisoxazole is readily recovered from the resulting reaction mixture by extraction with an organic solvent such as methylene chloride. A preferred method comprises distilling the mixture to obtain an aqueous azeotrope. The product can be recovered from this distillate by methods known to the art, such as by extraction with an organic solvent including aromatic hydrocarbons, such as benzene, toluene, or xylene; ethers, such as diethyl ether; and chlorinated hydrocarbons, such as methylene chloride. The organic extracts are then fractionated to recover the 5-methylisoxazole.

The following example is illustrative.

Example

A one-liter round-bottom flask, equipped with reflux condenser, thermometer, stirrer, and dropping funnel, was charged with 500 milliliters of methylene chloride and 54 grams of sodium methoxide. To the resulting suspension was added dropwise 60 grams of methyl formate over a 30-minute period while maintaining the reaction temperature at 25–30° C. by cooling. The reaction mixture was stirred for an additional 10 minutes and then 87 grams of acetone were added dropwise over a 30-minute period while again maintaining the reaction temperature at 25–30° C. After holding the reaction mixture at 25–30° C. overnight, 100 milliliters of water were added to dissolve the sodium hydroxymethyleneacetone which had formed. The aqueous and oragnic phases were separated and the methylene chloride phase was washed with three 50-milliliter portions of water. The aqueous extracts were combined, giving a total volume of 450 milliliters of aqueous sodium hydroxymethyleneacetone.

A two-liter round-bottom flask, equipped with stirrer, distillation column, and condenser, was charged with 775 grams of an aqueous solution containing 14.6 percent hydroxylamine-N-sulfonic acid. To this solution was added at room temperature (25–26° C.) 450 milliliters of the aqueous solution prepared as described above over a 5-minute period while stirring the mixture. After the solution had been added, the reaction mixture was rapidly heated, with boiling beginning at about 65–70° C. Heating was continued for about one hour and 10 minutes, during which time the vapor temperature had reached 100° C. and 600 milliliters of a 5-methylisoxazole/water distillate had accumulated.

To this distillate was added 100 grams of sodium chloride and the resulting solution was extracted with 75 milliliters of methylene chloride followed by four 50-milliliter portions of methylene chloride. The methylene chloride extracts were combined and the methylene chloride distilled off. The remaining residue was then fractionally distilled and the fraction distilling at 116–122° C. was collected. This fraction weighed 57.8 grams and contained 98.3 percent 5-methylisoxazole, corresponding to a yield of 68.4 percent based on methyl formate. This procedure was repeated five additional times. The average analysis of the 116–122° C. fraction was 98.3 percent 5-methylisoxazole, 1 percent 3-methylisoxazole, and 0.7 percent methanol and methylene chloride.

We claim:
1. A process for producing 5-methylisoxazole comprising reacting an alkali metal hydroxymethyleneacetone with hydroxylamine-N-sulfonic acid in an aqueous reaction medium in the absence of added acid.
2. The process as claimed in claim 1 wherein said alkali metal is sodium.
3. The process as claimed in claim 1 wherein said reaction is effected at a temperature of less than about 50° C.
4. The process as claimed in claim 3 wherein said alkali metal is sodium.

References Cited
UNITED STATES PATENTS 2,562,205   7/1951   Novotny et al. _____ 260—566

OTHER REFERENCES

Wiley: Heterocyclic Compounds, 1962, pp. 6–14, 55.

NICHOLAS S. RIZZO, *Primary Examiner.*

R. GALLAGHER, *Assistant Examiner.*

UNITED STATES PATENT OFFICE

CERTIFICATE OF CORRECTION

Patent No. 3,391,154                                          July 2, 1968

Charles William Den Hollander

It is certified that error appears in the above identified patent and that said Letters Patent are hereby corrected as shown below:

Column 1, lines 54 to 56, that portion of the formula reading "$C_6H_{13}O_3N_3$" should read -- $C_8H_{13}O_3N_3$ --.

Signed and sealed this 10th day of February 1970.

(SEAL)
Attest:

Edward M. Fletcher, Jr.                            WILLIAM E. SCHUYLER, JR.

Attesting Officer                                            Commissioner of Patents